United States Patent [19]

Mikami et al.

[11] Patent Number: 5,177,160

[45] Date of Patent: Jan. 5, 1993

[54] ORGANOPOLYSILOXANE GRAFT POLYESTER AND ITS MANUFACTURING METHOD

[75] Inventors: Ryuzo Mikami; Makoto Yoshitake; Tadashi Okawa, all of Ichihara, Japan

[73] Assignee: Dow Corning Toray Silicone Co., Ltd., Tokyo, Japan

[21] Appl. No.: 745,773

[22] Filed: Aug. 16, 1991

Related U.S. Application Data

[62] Division of Ser. No. 522,753, May 11, 1990, Pat. No. 5,082,916.

[30] Foreign Application Priority Data

May 31, 1989 [JP] Japan .................................... 1-138041

[51] Int. Cl.$^5$ .............................................. C08F 20/00
[52] U.S. Cl. ....................................... 525/446; 528/10; 528/16; 528/28
[58] Field of Search ........................ 528/26, 10, 16, 28; 525/446

[56] References Cited

U.S. PATENT DOCUMENTS

| | | | |
|---|---|---|---|
| 4,191,714 | 3/1980 | Yonezawa et al. | 525/102 |
| 4,348,510 | 9/1982 | Keck et al. | 528/26 |
| 4,452,962 | 6/1984 | Ginnings et al. | 528/26 |
| 4,496,704 | 1/1985 | Ginnings | 528/26 |
| 4,613,641 | 9/1986 | Haubennestel | 524/267 |
| 4,725,658 | 2/1988 | Thayer et al. | 528/15 |
| 4,791,189 | 12/1988 | Yu | 528/355 |
| 4,812,518 | 3/1989 | Haubennestel et al. | 525/474 |

OTHER PUBLICATIONS

Gaylord in N. A. J. Platzer, ed. *Copolymers, Polyblends and Composites* (1975), p. 76.

*Primary Examiner*—John C. Bleutge
*Assistant Examiner*—D. E. Aylward
*Attorney, Agent, or Firm*—Alexander Weitz

[57] ABSTRACT

An organopolysiloxane graft-type polyester is prepared by reacting, in the presence of an effective amount of a hydrosilylation catalyst, a polyester containing at least one alkenyl group and having no unsaturated terminal groups, said polyester having a number average molecular weight of about 500 to about 5,000, and an organopolysiloxane containing one hydrosilyl group. The organopolysiloxane graft-type polyester has excellent compatibility with polyesters and can improve the surface smoothness and hydrophobic property of the polyester when modified therewith.

6 Claims, No Drawings

ORGANOPOLYSILOXANE GRAFT POLYESTER AND ITS MANUFACTURING METHOD

This is a divisional of copending application Ser. No. 07/522,753 filed on May 11, 1990, now U.S. Pat. No. 5,082,916.

This invention concerns a type of organopolysiloxane graft polyester and its manufacturing method.

BACKGROUND OF THE INVENTION

It has been well known that polyethylene terephthalate, polybutylene terephthalate, and other polyesters can be effectively modified by an organopolysiloxane to obtain improvements in characteristics such as the hydrophobic property, water repellent property, weatherability, and lubricating property.

For example, as disclosed in U.S. Pat. Nos. 4,496,704; 4,452,962; and 4,348,510; when a diorganopolysiloxane containing alcoholic hydroxyl groups at its two terminals is added during the polymerization reaction of the polyester, it is possible to obtain a diorganopolysiloxane block-type polyester with improved surface smoothness. However, the diorganopolysiloxane-modified polyester obtained in this way has a disadvantage. In order to improve the surface smoothness and hydrophobic property by incorporating the diorganopolysiloxane portion into the main chain of this linear copolymer, the copolymerization rate of the diorganopolysiloxane must be increased. However, as the copolymerization rate of the diorganopolysiloxane is increased, the characteristics of the polyester disappear.

Furthermore, since the diorganopolysiloxane containing alcoholic hydroxyl groups at its two terminals lacks compatibility with the starting material polyester monomer, copolymerization is difficult and there is a significant residual portion that is not copolymerized.

SUMMARY OF THE INVENTION

In order to develop the manufacturing method of the organopolysiloxane-modified polyester free of said disadvantages, the present inventors have performed intensive research. As a result of this research work, the present invention was attained.

The purpose of this invention is to provide a new type of organopolysiloxane-modified polyester and a manufacturing method therefor. The organopolysiloxane graft-type polyester contains almost no free organopolysiloxane, it has excellent compatibility with polyesters, and can improve the surface smoothness and hydrophobic property of the polyester.

The manufacturing method of this invention is characterized by the fact that it can be used to produce the organopolysiloxane graft-type polyester with a high efficiency.

The present invention therefore relates to an organopolysiloxane graft-type polyester prepared by reacting, in the presence of an effective amount of a hydrosilylation catalyst, (A) a polyester containing at least one alkenyl group and having no unsaturated terminal groups, said polyester having a number average molecular weight of about 500 to about 5,000; and (B) an organopolysiloxane containing one hydrosilyl group.

DETAILED DESCRIPTION OF THE INVENTION

According to this invention, the main chain of the organopolysiloxane graft-type polyester is a polyester (A), having a organopolysiloxane (B) bonded to its side chain via an alkylene group. The polyester used as the main chain has a number average molecular weight of about 500 to 5000. The polyester may be either an aliphatic polyester or an aromatic polyester; it may be either a straight chain or branched chain.

The alkylene group for grafting the organopolysiloxane may be bonded to either the organic carboxylic acid portion or the alcohol portion of the polyester. The alkylene group may be attached directly to a carbon atom or it may be connected through an oxygen atom. Preferable terminals of the polyester include an ester group, followed by a hydroxyl group.

The preferable form of the grafted organopolysiloxane is a straight chain, followed by a branched chain. There is no special limitation on the degree of polymerization (DP) as long as it is 2 or larger. However, if the DP is too large, handling becomes difficult and its starting polysiloxane material lacks addition reactivity. Hence, the DP is usually less than about 2,000. From the standpoint of a modification effect, the average value of the DP is preferably about 3 to 100. Examples of the siloxane units that form the grafted organopolysiloxane include dimethylsiloxane, methylalkylsiloxane having 2 to 10 carbon atoms in their alkyl radicals, methylphenylsiloxane, methylsiloxane, trimethylsiloxane, dimethylbutylsiloxane, inter alia.

The organopolysiloxane-graft polyester of this invention may be in either the liquid form or solid form at room temperature.

Preferably, the alkenyl group-containing polyester used as component (A) in this invention should be in a straight chain form or branched chain form, with an ester group and/or a hydroxyl group containing no unsaturated group at the terminals of the molecular chain. In order to perform the grafting hydrosilylation reaction with the organopolysiloxane (B) containing a silicon-bonded hydrogen group at a high efficiency, the number average molecular weight of polyester (A) should be about 500 to 5,000.

Each polyester molecule should contain at least one alkenyl group. In order to improve the effectiveness of the organopolysiloxane graft-type polyester of this invention when used as a polyester modifier, the content of the organopolysiloxane should be high, but within the range for maintaining compatibility with the polyester. Hence, with respect to the repetitive units of the polyester, the content of the alkenyl groups should be about 20 to 200 mol %, preferably 50 to 100 mol % (i.e., 0.2 to 2.0 alkenyl groups for each polyester repeat unit).

The polyester component (A) can be produced using the conventional polycondensation method from a polyhydric carboxylic acid, or its derivative, and a polyhydric alcohol. As determined by the purpose of this invention, it is preferred that most of the starting materials be a dihydric carboxylic acid, or its derivative, and a dihydric alcohol.

Examples of the dihydric carboxylic acid that can be used include phthalic acid, isophthalic acid, terephthalic acid, tetrahydrophthalic acid, tetrachlorophthalic acid, oxalic acid, malonic acid, succinic acid, adipic acid, sebacic acid, cyclopentanedicarboxylic acid, among others.

Examples of the dihydric alcohol that can be used include ethylene glycol, propylene glycol, butanediol, hexamethylene glycol, hydrogenated bisphenol A, neopentyl glycol, diethylene glycol, triethylene glycol, dipropylene glycol, among others.

The alkenyl groups contained in the polyester (A) are introduced in the polyhydric carboxylic acid and/or polyhydric alcohol components used as starting materials. Examples of the components containing alkenyl groups include glycerin monoallyl ether, trimethylolpropane monoallyl ether, pentaerythritol monoallyl ether, pentaerythritol diallyl ether, and other polyhydric alcohols. Alternatively, these components may be selected from allyloxy isophthalic acid, allyloxy terephthalic acid, allyl malonic acid, and other polyhydric carboxylic acids. Depending on the copolymerization method, the polyhydric carboxylic acid component is added in an appropriate form, such as a carboxylic acid or its alkyl ester, halide, or other derivative.

Any of the following methods can be used to manufacture the polyester using polycondensation: a method using dehydration condensation of a polyhydric carboxylic acid and polyhydric alcohol; a method of the transesterification of a polycarboxylic ester and polyhydric alcohol; and a method of the hydrochloric acid dehydrogenation condensation of a halide of a polyhydric carboxylic acid and a polyalcohol in the presence of a base.

The molecular weight of the polyester depends on the ratio of the polyhydric carboxylic acid, or its derivative, to the polyhydric alcohol. That is, when the amount of the polyhydric carboxylic acid, or its derivative, added is in excess with respect to the polyhydric alcohol, the terminal groups become carboxylic acid, or its derivative.

According to this invention components (A) and (B) undergo a hydrosilylation reaction. Therefore, the terminal groups of the polyester should not hamper this reaction, nor should they induce side reactions. It is thus preferred that the terminal groups of the polyester be ester groups containing no unsaturated group. The terminal ester groups may be introduced by adding an appropriate amount of a monohydric alcohol component during the polycondensation reaction. However, when the organopolysiloxane graft-type polyester of this invention is used as a modifier for a polyester, it is necessary to effectively strip out the monohydric alcohol formed in the transesterification reaction from the reactive system. It is therefore preferred that the monohydric alcohol have about 1 to 12 carbon atoms, 1 to 6 carbon atoms being highly preferred. When a polyhydric carboxylic ester is used as the starting material, the ester portion of its configuration becomes the terminal group; hence, there is no need to add a monohydric alcohol component in this case.

When the amount of the polyhydric alcohol used is in excess with respect to that of the polyhydric carboxylic acid, or its derivative, a polyester having hydroxyl groups at its terminals can be obtained. In this case, there is the possibility of a condensation between the hydroxyl group and the SiH group in the subsequent hydrosilylation reaction. However, this reactivity is usually much lower than that of the hydrosilylation reaction, and hence causes no significant problem. If it is necessary to completely inhibit this side reaction, the terminal hydroxyl groups can be protected by a conventional silylating agent.

The organopolysiloxane (B) containing a hydrosilyl group may be in the form of a straight chain, branched chain, or network structure as long as each molecule contains one hydrosilyl (i.e., SiH) group. Among these, the straight chain form organopolysiloxane with one terminal having a hydrosilyl group is preferred. In this case, the other terminal of the organopolysiloxane may be, for example, a trialkysilyl group such as trimethylsilyl or n-butyldimethylsilyl. The organopolysiloxane can be produced using a conventional method. There is no special limitation on its molecular weight. However, in order to improve the polyester modification effect by the organopolysiloxane graft-type polyester of this invention, the average DP of the siloxane units should be in the range of about 3 to 100, preferably 5 to 50.

Examples of the organic groups bonded with the silicon atoms of organopolysiloxane (B) include methyl, ethyl, propyl, butyl, pentyl, hexyl, heptyl, octyl, and other alkyl groups; phenyl, naphthyl, and other aryl groups; benzyl group, phenethyl group, and other aralkyl groups; methoxy, ethoxy, propoxy, butoxy, pentyloxy, hexyloxy, heptyloxy, octyloxy group, and other alkoxy groups; phenoxy, naphthyloxy group, and other aryloxy groups; etc. In addition, there may also be a small amount of hydroxyl groups and amino groups bonded with the silicon atoms. In consideration of cost and performance, it is preferred that over half of the organic groups bonded with the silicon atoms be methyl groups.

There is no special limitation on the type of the hydrosilylation catalyst (C) used to promote reaction between components (A) and (B). The catalyst may be made of the well-known complexes of transition metals, such as platinum, palladium, rhodium, ruthenium, cobalt, nickel, etc. In particular, chloroplatinic acid, a platinum olefin complex, a complex of chloroplatinic acid and vinylsiloxane, and other platinum-family catalysts are preferred since they have a high catalytic effect and lead to few side reactions.

In the presence of the catalyst, the alkenyl groups of component (A) and the hydrosilyl groups of component (B) undergo an addition reaction to form the organopolysiloxane graft-type polyester of this invention. It is preferred that this addition reaction be performed with the appropriate ratio of component (A) to component (B) to ensure an equivalent or near equivalent molar amount of alkenyl groups and hydrosilyl groups. This addition reaction may be performed at any temperature from room temperature to 150° C., preferably 60° C. to 150° C. in order to shorten the reaction time and suppress side reactions. It is preferred to carry out the addition reaction in the presence of a solvent. This improves the reaction at a high efficiency since components (A) and (B) usually have a low compatibility with each other.

The solvent used should be able to dissolve both components (A) and (B), and may be selected from benzene, toluene, xylene, and other aromatic hydrocarbons as well as diethyl ether, tetrahydrofuran, and other ethers.

The organopolysiloxane graft-type polyester of this invention can be used as a coating agent, polyester additive, copolymerization component of the polyester, modifier of resins other than a polyester, inter alia.

EXAMPLES

In the following, this invention will be explained in more detail with reference to application examples, wherein "parts" refers to "parts by weight." Of course, these application examples do not limit the range of this invention.

APPLICATION EXAMPLE 1

10.2 parts of terephthaloyl dichloride and 30.0 parts of tetrahydrofuran were added to a dried reaction container equipped with a stirrer. While the reaction container was cooled, the mixture was stirred. A solution prepared by dissolving 7.8 parts of trimethylolpropane monoallyl ether and 11.1 parts of triethylamine in 12.0 parts of tetrahydrofuran was dripped in over a period of about 40 minutes, followed by heating to room temperature and stirring for 3 hours.

The reaction container was then cooled again by ice water, and 0.5 part of methanol was added to the reaction solution, followed by heating to 60° C. and stirring for 1 hour.

After cooling, the precipitate formed was filtered off and the filtrate was concentrated at a reduced pressure. The residue was diluted with about 50 parts of ethyl acetate, washed 3 times with the same amount of water, and dried with anhydrous sodium sulfate. After filtration, the filtrate was concentrated under reduced pressure, forming a very thick light-yellow liquid, which was analyzed and found to be a polyester with an average molecular weight of 2,560 and having 8.2 wt % of vinyl groups ($-CH=CH_2$) on the side chains.

In a dried reaction container equipped with a stirrer, 10.5 parts of the polyester obtained in the above operation and 50.0 parts of a polydimethylsiloxane having a molecular weight of 1,580, one terminal blocked by a hydrosilyl group and the other terminal blocked by an n-butyl group were weighed and dissolved in 200 parts of tetrahydrofuran. There was then added 0.2 part of an isopropyl alcohol solution of chloroplatinic acid (platinum concentration: 0.4 wt %). An addition reaction was then performed by heating the mixture to reflux.

The reaction was monitored by a gel permeation chromatograph equipped with a detector for the 9.5-$\mu$ IR band (characteristic absorption of siloxane) and a detector for 254-nm UV band (characteristic absorption of the benzene ring). In the initial period of the reaction, the peak of the polydimethylsiloxane detected by IR and the peak of the polyester detected by UV were observed with different retention times. After a reaction for 4 hours, the retention times of the peaks observed on the two detectors shifted to higher molecular weight side and became almost identical. Hence, it was determined that the polyester with polydimethylsiloxane grafted via a propylene group was obtained. The number-average molecular weight of the obtained polydimethylsiloxane graft-type polyester was 9,360 (standard polystyrene equivalent). After the reaction, concentration under reduced pressure was performed, obtaining a light-yellow transparent liquid, in which the free polydimethylsiloxane was present in a trace amount.

When the above liquid was added to polyethylene terephthalate, the compatibility was found to be good, there was no bleeding, and the surface smoothness and hydrophobic property were significantly improved.

APPLICATION EXAMPLE 2

11.7 parts of allyoxy isophthaloyldichloride and 30.0 parts of tetrahydrofuran were loaded into a dried reaction container equipped with a stirrer. While the reaction container was cooled by ice water, the mixture was stirred. A solution prepared by dissolving 5.2 parts of neopentyl glycol and 11.2 parts of triethylamine in 10.0 parts of tetrahydrofuran was dripped in over a period of about 30 minutes, followed by heating to room temperature and stirring for 5 hours. The reaction container was cooled again with ice water, then 0.5 part of methanol was added to the reaction solution, followed by heating to 60° C. and stirring for 1 hour.

After the resulting precipitate was filtered, the filtrate was concentrated under reduced pressure. The obtained residue was dried and dissolved in about 100 parts of acetone. After the insoluble portion was filtered off, the filtrate was again concentrated under reduced pressure, forming a light-yellow solid.

The analysis indicated that it was a polyester with an average molecular weight of 3,269 and having 9.7 wt % of vinyl groups ($-CH=CH_2$) in the side chains.

In a dried reaction container equipped with a stirrer, 55.6 parts of the polyester obtained in the aforementioned operation, and 10.0 parts of polydimethylsiloxane (molecular weight = 1,580, one terminal blocked by a hydrosilyl group and the other terminal blocked by an n-butyl group) were weighed and dissolved in 200 parts of tetrahydrofuran. Subsequently, 0.02 part of a platinum-vinyl siloxane complex (platinum concentration: 4.4 wt %) prepared from chloroplatinic acid and 1,3-divinyltetramethyldisiloxane was added. The reaction mixture was then heated to reflux to facilitate the addition reaction.

In the same way as in Application Example 1, the reaction was monitored by a gel permeation chromatograph. It was found that a polyester with polydimethylsiloxane grafted via a propylene group was obtained.

The number-average molecular weight of the obtained polydimethylsiloxane graft-type polyester was 15,730 (standard polystyrene equivalent). After the addition reaction, by concentration under reduced pressure, a light-yellow transparent liquid was obtained. In this liquid, the free polydimethylsiloxane was present in a trace amount.

This liquid was added during the polymerization of polyethylene terephthalate. As a result, the surface smoothness and the hydrophobic property were significantly improved.

APPLICATION EXAMPLE 3

15.2 parts of terephthaloyldichloride and 35.0 parts of tetrahydrofuran were added to a dried reaction container equipped with a stirrer. While the reaction container was cooled by ice water, the mixture was stirred.

A solution prepared by dissolving 7.8 parts of trimethylolpropane monoallyl ether, 1.4 parts of ethylene glycol, and 16.7 parts of triethylamine in 15.0 parts of tetrahydrofuran was dripped in over a period of about 40 minutes. The mixture was heated to room temperature and stirred for 3 hours. It was then cooled again by ice water and added with 0.7 part of methanol, followed by heating to 60° C. and stirring for 1 hour. After the reaction mixture was cooled, the resulting precipitate was filtered and the filtrate was concentrated under reduced pressure. The residue was diluted with about 100 parts of ethyl acetate, then washed three times with the same amount of water, and dried with anhydrous sodium sulfate. After filtration, the filtrate was concentrated under reduced pressure to form a very thick light-yellow liquid. The analysis indicated that it was a polyester having an average molecular weight of 1,640 and containing 5.9 wt % of vinyl groups ($-CH=CH_2$) in the side chains.

In a dried reaction container equipped with a stirrer, 14.7 parts of the polyester obtained above and 50.0 parts of polydimethylsiloxane (molecular weight=1,580, one terminal blocked by a hydrosilyl group and the other terminal blocked by an n-butyl group) were weighed and dissolved in 200 parts of tetrahydrofuran. Subsequently, 0.02 parts of a platinum-vinyl siloxane complex (platinum concentration: 4.4 wt %) was added. The addition reaction was then performed by heating the mixture at reflux for 5 hours. In the same way as in Application Example 1, the reaction was monitored by a gel permeation chromatograph. It was confirmed that the polyester with polydimethylsiloxane grafted via a propylene group was obtained. The obtained polydimethylsiloxane graft-type polyester had a number-average molecular weight of 4,600 (standard polystyrene equivalent). After the reaction, concentration under reduced pressure was performed, forming a light-yellow, transparent, thick liquid. In this liquid, the free polydimethylsiloxane was present in a trace amount.

APPLICATION EXAMPLE 4

7.1 parts of the polyester containing allyl groups prepared in Application Example 3 and 50.0 parts of polydimethylsiloxane (molecular weight=3,250, one terminal blocked by a hydrosilyl group and the other terminal blocked by an n-butyl group) were weighted and dissolved in 200 parts of tetrahydrofuran. Subsequently, 0.02 part of a platinum-vinylsiloxane complex (platinum concentration: 4.4 wt %) prepared from chloroplatinic acid and 1,3-divinyltetramethyldisiloxane was added. The addition reaction was then performed by heating the mixture at reflux for 5 hours. In the same way as in Application Example 1, a gel permeation chromatograph was used to monitor the addition reaction. It was confirmed that a polyester with polydimethylsiloxane grafted via a propylene group was obtained.

The obtained polydimethylsiloxane graft-type polyester had a number-average molecular weight of 15,200 (standard polystyrene equivalent). After the reaction, the reaction product was concentrated under reduced pressure to form a light-yellow transparent thick liquid. In this liquid, the free polydimethylsiloxane was present in a trace amount.

We claim:

1. A polyester modified with a polydimethylsiloxane graft-type polyester characterized by the fact that said polydimethylsiloxane is grafted onto the side chain of a polyester having a number average molecular weight of 500 to 5,000 via an alkylene group.

2. The polyester according to claim 1, wherein said polydimethylsiloxane has a straight chain structure.

3. The polyester according to claim 2, wherein the degree of polymerization of said polydimethylsiloxane is about 5 to 50.

4. A composition consisting essentially of a polyester which is modified with a polydimethylsiloxane graft-type polyester, said graft-type polyester being prepared by reacting, in the presence of an effective amount of a hydrosilylation catalyst, (A) a polyester containing at least one alkenyl group and having no unsaturated terminal groups, said polyester having a number average molecular weight of about 500 to about 5,000; and (B) a polydimethylsiloxane containing one hydrosilyl group.

5. The composition according to claim 4, wherein said polydimethylsiloxane is a straight chain structure having a hydrosilyl group at one end of the chain and the ratio of components (A) and (B) is fixed so as to provide approximately one hydrosilyl group for reaction with each alkenyl group.

6. The composition according to claim 5, wherein the degree of polymerization of said polydimethylsiloxane is about 5 to 50.

* * * * *